United States Patent

[11] 3,574,263

| [72] | Inventor | Joe Del Elia<br>Scottsdale, Ariz. |
|---|---|---|
| [21] | Appl. No. | 744,590 |
| [22] | Filed | July 11, 1968 |
| [45] | Patented | Apr. 13, 1971 |
| [73] | Assignee | Educational Computer Systems, Inc.<br>Phoenix, Ariz. |

[54] EXAMINATION GRADING COMPUTER
5 Claims, 10 Drawing Figs.

[52] U.S. Cl.................................................... 35/48,
235/61.6
[51] Int. Cl..................................................... G09b 7/00,
G06k 7/14
[50] Field of Search.......................................... 35/48.2; -
235/61.6(03); 270/(Inquired); 271/(Inquired);
226/171

[56] References Cited
UNITED STATES PATENTS

| 3,324,576 | 6/1967 | Shaw et al..................... | 35/48.2 |
|---|---|---|---|
| 2,048,754 | 7/1936 | Putnam.......................... | 226/161 |
| 3,216,132 | 11/1965 | Flaherty et al................. | 35/48.2 |

*Primary Examiner*—Wm. H. Grieb
*Attorney*—Townsend and Townsend

ABSTRACT: A portable examination grading computer in which an opaque master answer guide may be mounted on a rotating drum having sources of illumination mounted therein, and photoelectric sensors mounted opposite. Student answer sheets, having answers marked in appropriate locations by blacking in answer areas, may be engaged with the drum for rotation past the source of illumination. If light passes through an appropriate perforation in the opaque master answer guide and through an unmarked answer area on the student answer sheet, the computer circuitry will actuate a marker adjacent the incorrect answer on the answer sheet and will tally the total of incorrect answers.

PATENTED APR 13 1971 3,574,263
SHEET 1 OF 4
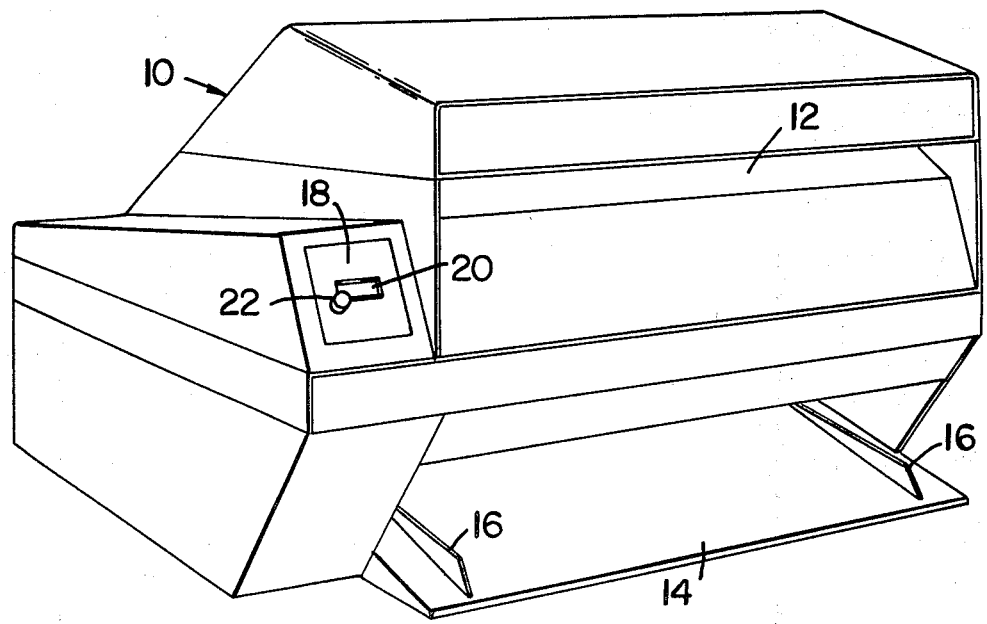
FIG_1
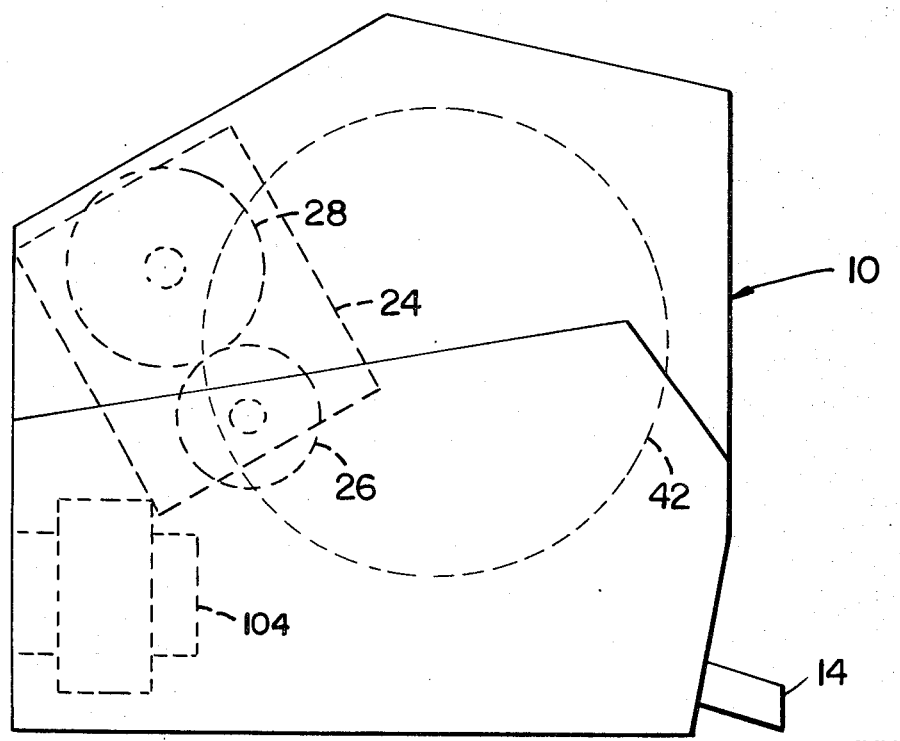
FIG_3
INVENTOR.
JOE Del Elia
BY
Townsend and Townsend
ATTORNEYS

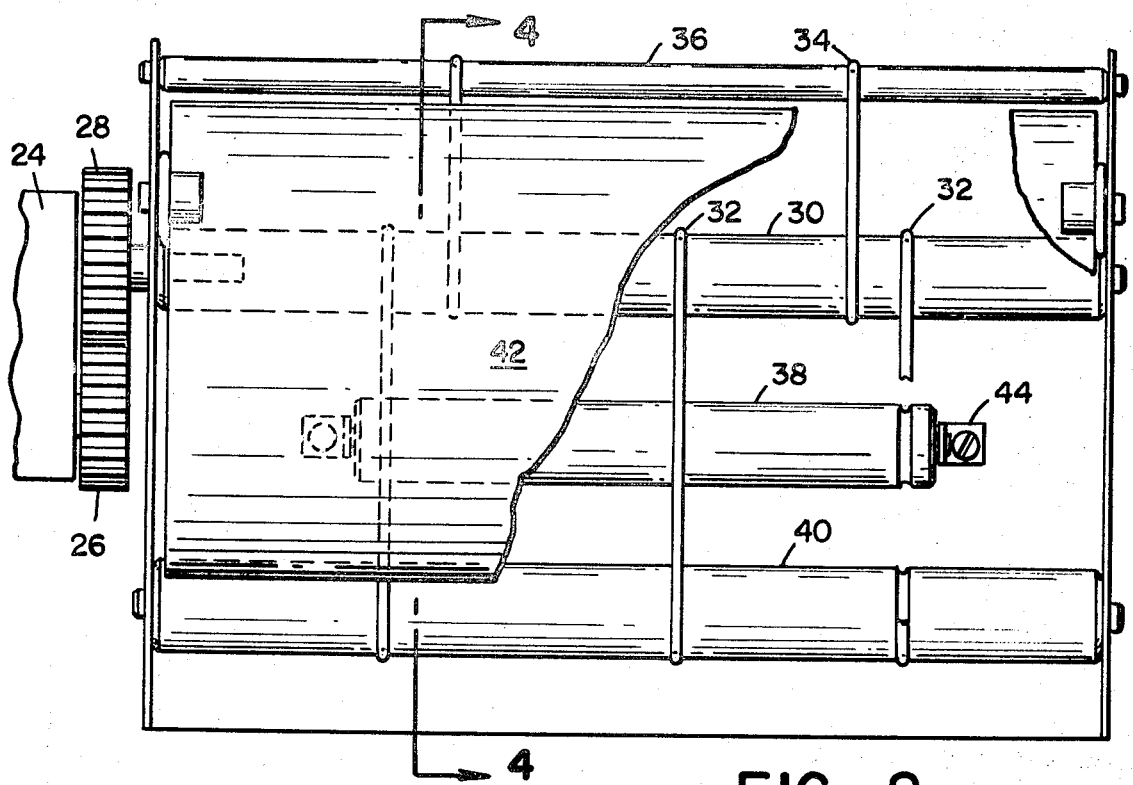
FIG_2
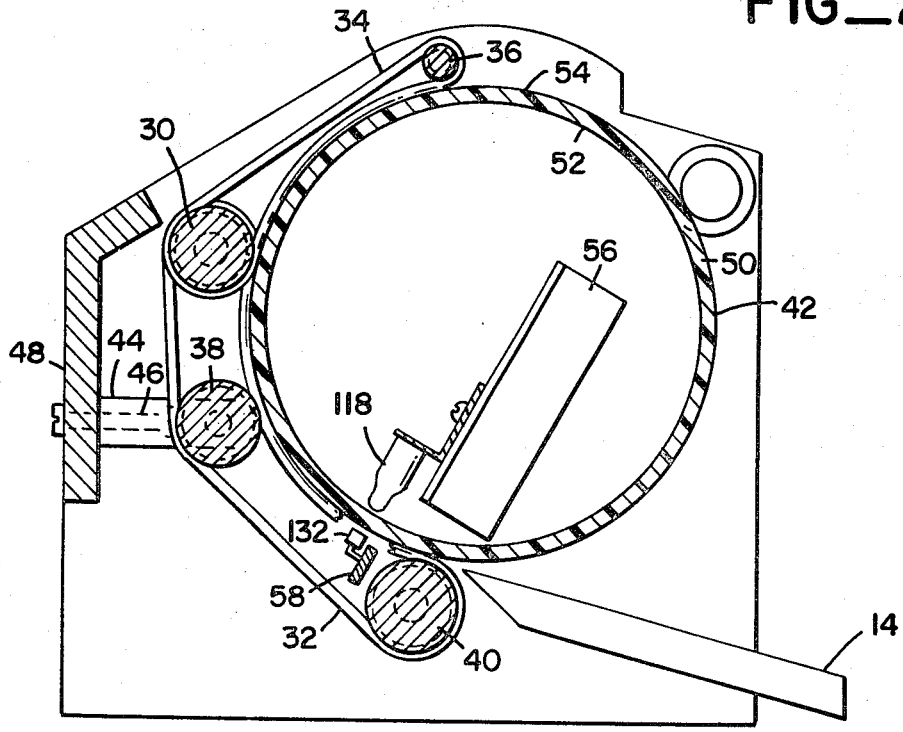
FIG_4

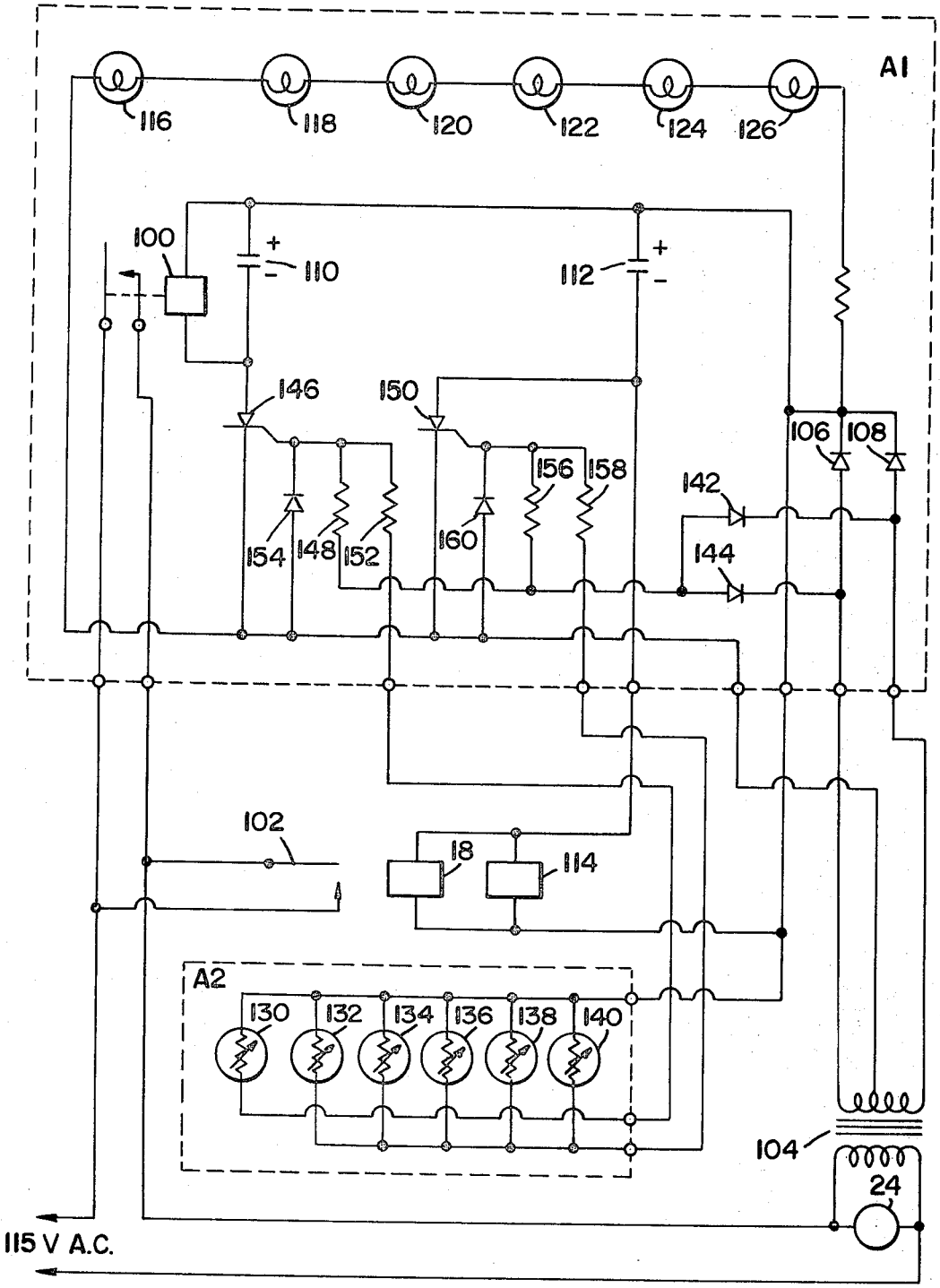
FIG_5

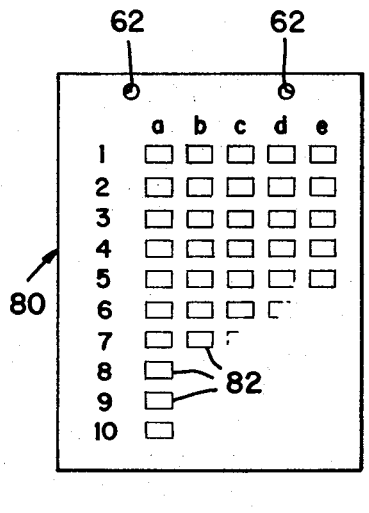
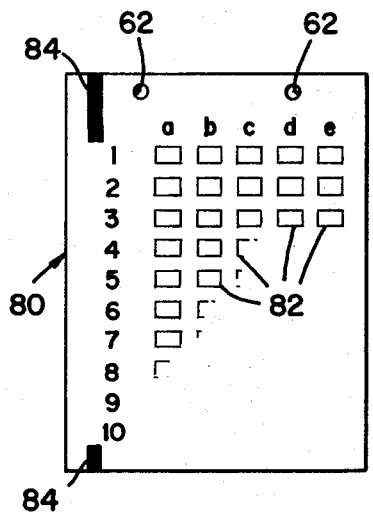
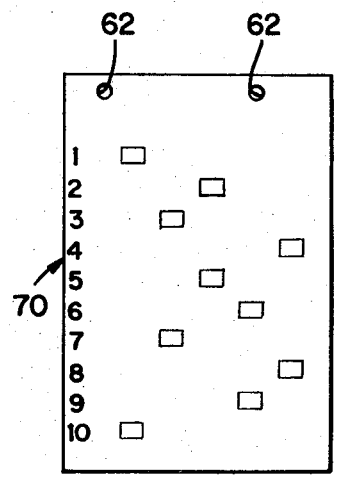
FIG_6A   FIG_6B   FIG_6C
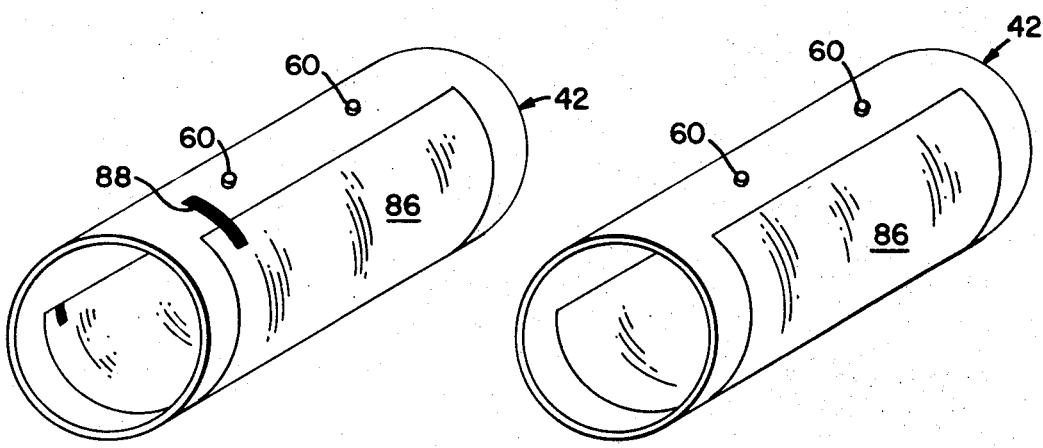
FIG_7A   FIG_7B

EXAMINATION GRADING COMPUTER

This invention relates to examination grading devices and, more particularly, to a portable examination grading computer for the grading of student examination answer sheets.

There are many machines shown in the prior art which are designed to grade students' examination papers automatically. One of the earliest of the automatic grading machines is shown in the patent to Sveda, U.S. No. Re. 20,463, issued in 1937. One of the most recent of the automatic scoring machines is that of Shaw, et al., U.S. Pat. No. 3,324,576, issued in 1967. In the 30 years intervening between the Sveda patent and the Shaw patent, many automatic scoring machines and devices have been patented. These machines are generally of substantial complexity, often involving highly sophisticated circuitry and highly complex drive and selection mechanisms. To the best of my present knowledge, none of the machines has been commercially successful. Review of the patents indicates that each of the prior art machines appears to have substantial drawbacks, both electrically and mechanically.

The Sveda machine utilizes perforated answer sheets together with feelers which contact a metallic drum beneath the answer sheet to indicate, by the completion of an electrical circuit, a correct or incorrect answer. Other machines are designed to utilize answer sheets with conductive markings to be sensed by electric feelers to complete circuits and thus register correct or incorrect answers. Some of the conductive mark type machines utilize highly sophisticated circuitry for comparing the answers on a student's examination paper with a master answer sheet which is also marked with conductive pencil. Some of the machines are arranged so that the circuit is preset to make the comparison.

As a further step in the process of development of such machines, light sources were utilized to detect the presence of answer marks on the examination paper, with reflected or transmitted light being detected to determine whether or not an answer location was properly answered. The circuits in the machines utilizing light sources are, in general, as complex as those of the machines utilizing conductive marks.

In addition to the complex detection devices and circuitry the automatic grading machines of the prior art utilize extremely complex feeding mechanisms and release mechanisms so that there is strong likelihood that the student answer sheets will not feed properly, will jam easily, or will not be released by the apparatus after having passed through for grading. In addition, because of the large number of complex parts utilized in these machines, breakdown is common, both through the machine going out of adjustment and through the machine parts malfunctioning.

The present student examination grading computer was designed to eliminate the problems associated with prior art machines by simplifying the circuitry and the mechanical details so that the computer may be utilized directly by the teachers involved without the necessity of having skilled personnel in attendance. Because of its utter simplicity the cost of the device can be held to a minimum thus making the machine more easily available to small schools.

The present machine comprises a rotatable hollow drum adapted to carry on its surface a perforated master answer guide and provided with means for engaging students' answer sheets which are fed into the machine. A source or sources of illumination are mounted inside the drum, the drum being provided with a transparent portion to permit light to pass from the inside of the drum to the outside. Mounted on the outside of the drum are photosensors, such as photocells, closely adjacent the surface of the drum and in line with the sources of illumination so that light passing through the drum will impinge directly on the photocells. The master answer guide, which is made from a flexible, opaque, material and which has perforations in it corresponding to the correct answer locations on the student examination answer sheet, is affixed to the outside surface of the drum. Thus the perforations form small windows through which light may pass from the illumination source inside the drum to the photocells outside the drum. A student answer sheet which has perforations or other means at one end thereof for being engaged by complementary pins on the drum surface is then fed into the machine.

A novel drive system helps hold the answer sheet onto the surface of the opaque master answer guide as the drum rotates. The student answer sheet has a plurality of columns thereon, a row perpendicular to the columns being the location for the answer or answers required for a particular question. The answer is indicated in the row by blackening in an answer block space in the appropriate column or columns. When the answer paper is engaged on the drum, the columns will be aligned with the photocells and, of course, the perforations in the master answer guide will be in registry with both the columns and the rows so that a correct answer will be indicated by a blackened answer block space in registry with the appropriate perforation.

The student examination answer sheet is made of translucent material so that if the student fails to answer, or answers incorrectly, that is, fails to blacken in the appropriate answer block space, light will be passed through the drum and the answer sheet and impinge upon the photocell opposite that column. The photocells are connected through appropriate circuitry so that upon signal from a photocell that the answer is incorrect, a solenoid marker will be energized to place a mark opposite the incorrect answer row, and also actuate a counter to either tally the number of correct answers or to subtract the number of incorrect answers from the total score. Thus the appropriate grade for the particular student answer sheet is automatically calculated.

The novel drive system which is part of the present machine aids in holding the student examination answer sheet tightly against the master answer guide which in turn is mounted around the circumference of the drum. Thus, with the student answer sheet held close to the guide, little if any stray light will pass from the illumination source inside the drum to the photoelectric sensors on the outside of the drum. Therefore, the machine will maintain its accuracy under all conditions of use. The drive system comprises a series of grooved rollers spaced around the circumference of the drum and carrying a plurality of rubber belts having a round cross section. Such belts resemble large diameter O-rings in appearance. The belts cover an approximately 180° of the circumference of the drum so that the student answer sheet is held tightly against the drum for the entire portion of the rotation during which the answer indication areas are sensed.

Another novel feature of the present invention resides in the provision of a means for sensing that the answer indication area of the examination answer sheet is in position to be sensed so that the examination grade may be computed by the machine.

The student answer sheet is set up so that multiple-choice type questions may be answered in one or more of a plurality of columns which are printed on the sheet. The columns are aligned perpendicular to the axis of rotation of the computer drum. The answer sheet may be provided with an opaque printed answer indicator stripe along one edge of the sheet to act as a means to determine, automatically, that the answer indication area of the examination answer sheet is in position to be checked by the machine. Alternatively, the opaque stripe may be along one edge of the drum so that the master answer guide would leave it uncovered. The stripe is in registry with a photocell and source of illumination mounted on opposite sides of the drum so that no light would be passed through the drum when the opaque stripe is between photocell and its source of illumination. Thus, at a break in the stripe at the beginning of the answer indication area on the examination answer sheet, the machine would automatically sense the answers are in position to be sensed and continue the process of sensing each answer row in turn. After the last answer on the sheet has been sensed, the opaque stripe on the edge would once again be present and the machine would turn itself off automatically.

The means for engaging the student answer sheets to the drum may, preferably, be a pair of rounded pins protruding from the surface of the drum. The pins are spaced apart and complementary to holes located near the top edge of the student answer sheet. The mechanism is arranged so that after the student answer sheet is engaged and the drum rotates approximately 270°, the answer sheet will slip from the pins and fall into an accumulation tray to be removed by the instructor or operator grading the papers.

The student answer sheet 80 is provided with a plurality of columns of answer indication blocks 82 to permit the answering of multiple-choice type questions. The answer sheet 80 may be provided with an opaque printed answer indicator stripe 84 near one edge of the sheet to act as a means to determine, automatically, that the answer indication area of the examination answer sheet is in position to be checked by the machine.

The student answer sheet 80 is wider than the master answer guide 70 so that the opaque answer indicator stripe 84 does not overlie the answer guide 70 when the two sheets are engaged by the pins 60 on the drum 42.

The drum 42 is provided with a pair of pins 60 to engage the complementary holes 62 at the top of the student answer sheet 80 to carry the answer sheet along the answer sensing path past the photoelectric sensors. The drum 42 is provided with a transparent portion 86 which may be made of glass or plastic or other suitable material. The transparent portion 86 of the drum is sized to accommodate the student answer sheet 80 so that light from the miniature lamps 116 through 126 will pass through the drum and illuminate the respective photocells aligned with each. In those cases in which it is desired to utilize a student answer sheet without the opaque indicator stripe 84, an opaque indicator stripe 88 may be applied to the drum in order to serve the function of maintaining the rotation of the drum while the student answers are being graded.

In the drawings:

FIG. 1 is a perspective view of the examination grading computer of the present invention;

FIG. 2 is a front elevation of the machine, broken away to show the drive belts;

FIG. 3 is an end elevation of the machine;

FIG. 4 is a sectional view taken along line 4—4 of FIG. 2; and

FIG. 5 is a circuit schematic of the examination grading computer of the present invention.

FIG. 6A is a plan view of a student answer sheet showing the multiple choice answer areas;

FIG. 6B is a student answer sheet with an opaque answer indicator stripe printed adjacent one edge thereof;

FIG. 6C is a master answer guide showing the perforations corresponding to correct answer locations on the student answer sheet;

FIG. 7A is a perspective view of the drum showing the pins for engaging the student answer sheets and the opaque answer indicator stripe; and FIG. 7B is a perspective view of the drum showing the pins for engaging the student answer sheet and the transparent portion of the drum without the opaque answer indicator stripe.

Referring now more particularly to the drawings in which the same reference numerals refer to the identical parts in each of the several views, the examination grading computer of the present invention is shown generally in FIG. 1. At the front of the machine 10 is the answer sheet slot 12 into which the student answer sheets are fed one by one to be checked and graded by the internal mechanism to be described below. After the answer sheets have been examined, they are discharged into the receiving tray 14 between the upright paper guides 16. On the left portion of the machine, the tally counter 18 is mounted with a small window 20 through which the tally of incorrect answers or the grade may be seen. The reset button 22 controls both resetting the tally counter and the recycling of the machine to accept the next student answer sheet.

The drive mechanism of the machine comprises a drive motor 24 connected by a set of drive gears 26 and 28 to the main drive roller 30. The drive roller has rounded grooves cut in it to accept round cross section drive belts 32 and similar round cross section supplemental drive belts 34. The drive belts 34 are driven between the main drive roller 30 and the spacer roller 36 while the main drive belts 32 pass around the drive roller 30, a tension roller bar 38 and the exit roller bar 40. Each of the rollers heretofore described is, of course, properly mounted on bearings to be completely free in rotation during the operation of the machine.

FIG. 4, since it is an end, sectional view, shows the drive belts as they pass over the rollers and along the circumference of the drum 42. The supplemental drive belts 34 pass between the drive roller 30 along an upper quadrant of the drum while the main drive belts 32 pass from the drive roller across the tension bar 38 and around the exit roller bar 40, covering, at the same time, a lower quadrant of the drum 42.

The drive belts 32 and 34 together cover approximately one-half the circumference of the drum 42. Thus, as the examination answer sheets are fed into the machine onto the top surface of the drum 42, they will be gripped by the drive belts 34 along an upper quadrant of the drum. The belts will press the paper tightly against the master answer guide which has been fastened to the surface of the drum. When the drum has rotated approximately 90°, the answer sheets will be gripped in turn by the belts 32 which cover a lower quadrant of the drum. As the drum 42 continues to rotate, the answer sheet is no longer held against the drum and thus falls into the receiving tray 14 between the paper guides 16.

The tension roller bar 38 is adjustable being mounted on brackets 44 connected by bolts 46 to the rear wall 48 of the machine. Tightening and loosening the bolts will permit putting more tension on the belts towards one end of the drum or the other in order to correct slewing of the paper as it travels around the drum.

The drum 42 which is mounted on bearings at either end for smooth rotation is made with a transparent wall 50 in order to permit light to pass from the inside surface 52 to the outside surface 54. On the inside of the drum 42 mounted on a support bracket 56 are a plurality of lamps 116 through 126 and mounted on a support bracket 58 adjacent the outside surface 54 of the drum are a plurality of photoelectric sensors 130 through 140. In FIG. 4 only one of the lamps and one of the photocells is shown since the others are directly in line with those illustrated.

The master answer guide 70 used with the present computer is made of a flexible opaque material punched out in locations corresponding to the answer blocks to be blocked in by the student to answer the questions. The guide is fastened around the drum by means not separately shown. The drum 42 is provided, in the present embodiment, with two pins 60 equally spaced on the drum and corresponding to two punched holes 62 at the top of the student's answer sheet 8 to be graded. When the student answer sheet is fed into the computer, the two pins engage the punched holes at the top of the answer sheet and carry the sheet around the drum. Since the belt drives do not touch the drum 42 in the area adjacent the receiving tray 14, the student answer sheets drop from the drum and into the receiving tray 14 between the guides 16. Mounted adjacent the drum 42 and close to the photocells and lamps is a marking solenoid 114. This solenoid is connected to the circuitry and is actuated by the circuit when a wrong answer is sensed. The solenoid operates a marking pen so that when the wrong answer is sensed, a small mark is placed opposite the wrong answer on the student answer sheet so that it may be noted by the student when the graded paper is returned.

The student answer sheet 80 is provided with a plurality of columns of answer indication blocks 82 to permit the answering of multiple choice type questions. The answer sheet 80 may be provided with an opaque printed answer indicator stripe 84 near one edge of the sheet to act as a means to determine, automatically, that the answer indication area of the examination answer sheet is in position to be checked by the machine. The student answer sheet 80 is wider than the master answer guide 70 so that the opaque answer indicator stripe 84 does not overlie the answer guide 70 when the two sheets are engaged by the pins 60 on the drum 42.

The drum 42 is provided with a pair of pins 60 to engage the complementary holes 62 at the top of the student answer sheet 80 to carry the answer sheet along the answer sensing path past the photoelectric sensors. The drum 42 is provided with a transparent portion 86 which may be made of glass or plastic or other suitable material. The transparent portion 86 of the drum is sized to accommodate the student answer sheet 80 so that light from the miniature lamps 116 through 126 will pass through the drum and illuminate the respective photo cells aligned with each. In those cases in which it is desired to utilize a student answer sheet without the opaque indicator stripe 84, an opaque indicator stripe 88 may be applied to the drum in order to serve the function of maintaining the rotation of the drum while the student answers are being graded.

The computer circuits are illustrated in FIG. 5. The circuits consist of two major subcircuits, A1 and A2, the first of which provides illumination of a control band on the reading drum, and the answer columns on the master answer guide. The second subcircuit consists of photocells illuminated by the respective lamps of A1.

In the quiescent state relay 100 is deenergized, and reset switch 102 is open; no path exists from the 115 v. AC line input to either the drum drive motor 24, nor to the circuit power transformer 104. With the master answer guide and a student's completed answer sheet properly loaded onto the drum, the operator depresses the manual reset switch 102 located on a three-digit electromechanical counter 18. This action is mechanically linked to the counter wheels to cause a reset from any present displayed number back to 000 and simultaneously, through contacts, applies power to the drum drive motor 24 and the control circuit power transformer 104.

Diodes 106 and 108 provide a source of positive, fullwave, unfiltered DC voltage from the secondary windings of transformer 104 with respect to the winding center-tap to relay 100, capacitors 110 and 112, the counter 18 actuating coil and to the marking pen solenoid 114. This voltage is also applied to miniature lamps 116 through 126 through dropping resistor 128, causing the lamps to illuminate. The lamps are positioned on the inside of the drum while the photocells 130 through 140 are positioned on the outside of the drum in such a manner that the light from each lamp, with the exception of lamp 116 and photocell 130, illuminates its respective photocell through the clear plastic material of the drum. Lamp 116 and photocell 130 are mounted towards one end of the drum outside of the area over which the master answer guide and student answer sheets lay. A short, opaque stripe on this end of the drum prevents the light from lamp 116 from impinging on photocell 130 until a preselected angular displacement of the drum has occurred and the answer indication area is aligned with lamps 118 through 126.

Two diodes 142 and 144 provide a source of negative, full wave, unfiltered DC voltage also from the secondary winding of transformer 104 with respect to the centertap lead. This negative voltage is applied to the gate lead of Thyristor (Silicon controlled rectifier) 146 through resistor 148. At the same time, a counteracting positive voltage is applied to the gate lead of Thyristor 150 through the resistance of photocell 130 and resistor 152. The photodiodes utilized are the variable-conductive type so that as long as the light from lamp 116 remains behind the opaque stripe on the drum, the total resistance of photocell 130 and resistor 152 is much larger than the value of resistor 148, causing a net negative potential to always appear at the gate lead of Thyristor 146. Diode 154 limits this negative voltage to safe limits blow the reverse gate-to-cathode rating of the devices use.

As soon as the opaque area of the drum passes from between the lamp 116 and photocell 130, the resistance of 130 rapidly decreases until the net resistance of photocell 130 and resistor 152 is lower than the resistance of resistor 148. At this time, the net voltage on the gate lead of Thyristor 146 becomes positive causing 146 to conduct between the cathode and anode terminals. Resistor 152 limits the maximum current which can be drawn through photocell 130 when illuminated by strong light to prevent failure of the photocell by overdissipation.

When Thyristor 146 first conducts, the cathode-anode current flows through the coil of relay 100 closing the contacts shown. Since this load is inductive, it is paralleled by capacitor 110 which causes thyristor 146 to cease conducting at the end of each half-cycle of applied voltage from transformer 104 by allowing the current through 146 to drop to zero at the time the applied voltage drops to zero. As long as photocell 130 is illuminated, each half-cycle of the applied voltage produces a positive gate voltage and retriggers thyristor 146 into conduction with the net result of holding the contacts of relay 100 closed.

The contacts on relay 100 shunt the contacts on the reset switch 102 permitting the release of switch 102 to the normal position. As long as photocell 130 remains illuminated, AC input power is applied to the drum drive motor 24 and the control circuitry; the drum will continue to revolve until the opaque area again intercedes between lamp 116 and photocell 130 at which time the resistance of photocell 130 rapidly increases, the net gate voltage to thyristor 146 goes negative, thyristor 146 no longer retriggers, relay 100 deenergizes and its contacts open. The drum motor will then stop and power is removed from the control circuit until the reset switch 102 is again reactivated.

During the period of drum revolution the columns on the answer sheets containing the answer blocks pass across the beams of light from lamps 118 through 126 to photocells 132 through 140 mounted inside and outside of the drum respectively. Since locations in the master guide are opaque for all but the correct answer block for each question, little light will impinge on any of the five cells if a student has blackened the proper answer block for each question on his answer sheet. If the correct answer block for any question is left unmarked, one of the five cells will be illuminated for that particular question indicating an incorrect answer.

The five answer-sensing photocells 132 through 140 are connected in parallel on subassembly A2; thus, as long as none is illuminated, their net resistance together with resistor 158 is higher than resistance of resistor 156. In a like manner as with thyristor 146, thyristor 158 remains cut off. If any one of the answer photocells is activated by an incorrect answer on the student's sheet, the net resistance of that cell and resistor 158 is lower than the resistance of resistor 156; positive gate voltage is applied to thyristor 150 and conduction occurs from the cathode to anode of thyristor 150 through the marking pen solenoid 114 and the coil of the tally counter 18. Capacitor 112 performs the same function as capacitor 110, causing turnoff of thyristor 150 at each half-cycle of the applied AC voltage. As the unblackened answer block passes across one of the answer photocells, thyristor 150 will retrigger providing a net DC voltage to the marker pen solenoid 114 and the counter coil resulting in one "wrong" answer tallied on the counter and a mark being made on the test paper next to the incorrect answer. After the unblackened answer block passes from between the lamp and the cell, the gate voltage on thyristor 150 returns to negative and retriggering ceases until another incorrect answer is detected in any one of the five answer block tracks.

The tally counter 18 may alternatively be arranged to count downward from 100 so that the incorrect answers will be subtracted from 100 and the final grade read directly from the counter. As a further refinement, the counter may be connected with a printing counter so that the final grade may be printed directly on the answer sheet rather than having the instructor or operator do so.

I claim:

1. An examination paper grading machine comprising: a rotatable, hollow drum for carrying a master answer sheet, said drum provided with means for engaging a student answer sheet; a source of illumination mounted inside the drum adjacent the inner surface thereof, said drum provided with means for passing illumination from the inner surface to the outer surface; a plurality of photosensors mounted adjacent the outer surface of the drum and aligned with the source of illumination so that light passing from the source and through the drum will be received by the photosensors; means for rotating the drum; circuit means for receiving a signal from the photosensors when light from the illumination source is received by at least one of the photosensors, said circuit adapted to actuate a wrong answer indicator upon the receipt of said signal; and sensing means comprising an elongate opaque stripe along the circumference of the drum for blocking a portion of the illumination through the drum during that part of the rotation of the drum during which the answer areas on the student answer sheet are not in position for grading so that the rotation means will continue rotation of the drum until the answer area has passed the photosensors.

2. The apparatus of claim 1 and wherein the student answer sheets are made of translucent materials and have a plurality of columns thereon providing multiple answer marking locations in a row perpendicular to the columns; and wherein the student answers are marked in the appropriate locations by means of substantially opaque marks; the master answer sheet is substantially opaque and has perforations therein in registry with the correct answer locations on the student answer sheets when the student answer sheets and the master answer sheet are placed in juxtaposition in the machine, and the student answer sheet includes an opaque strip near the end thereof and aligned with the answer indication area for the sensing of the presence of the answers in position to be scored.

3. The apparatus of claim 1 and including means for holding the student answer sheet and the master answer sheet in juxtaposition during approximately one-half revolution of the drum carrying the master answer sheet, and wherein the engaging means on the drum is disposed so as to release the student answer sheet after approximately 270° of rotation from the point of engagement.

4. The apparatus of claim 4 wherein Apparatus for grading examination papers having answers indicated thereon in at least one of a plurality of columns along a row perpendicular to the columns in an answer indication area comprising: means for carrying an examination answer sheet along a path; a first sensing station along the path for sensing answers on an answer sheet; said first sensing station comprising a plurality of first light sources on one side of the path and a plurality of photoelectric sensors on the other side, each said sensor aligned with a first light source to receive illumination therefrom; a second sensing station for sensing that the answer indication area of the answer sheet is aligned with the first sensing station; the second sensing station comprising a second light source and a photoelectric sensor aligned with each other on opposite sides of the path adjacent one edge of the path so that said second sensing station is adjacent to and aligned with one edge of the answer sheet; a master answer guide having perforations therein in registry with the answer positions in the answer columns indicating the correct answers for that row, said guide being narrower than the answer sheet and adapted to be carried, together with the answer sheet, past the answer sensing station; means responsive to a signal from the first sensing station, said signal being an indicator of an incorrect answer, said responsive means adapted to mark an incorrect answer indicium on the examination sheet adjacent the answer row which has been sensed; the means for carrying the answer sheet along the path comprising a rotatable drum having a substantial portion of the surface thereof transparent and the balance thereof opaque so that illumination from the first light sources will pass through the drum and through the perforations in the master answer guide, and the illumination from the second light source will pass through a transparent portion of the drum adjacent one edge thereof; and means for accumulating the number of incorrect answers in response to said incorrect answer signals.

5. The apparatus of claim 4 and wherein the second light source is in registry with an opaque portion of the drum when the drum is in position to accept a student answer sheet for carriage along the path; and upon rotation of the drum so that when the answer indication area of the answer sheet comes into alignment with the first sensing station a transparent portion of the drum is in registry with said second light source.